United States Patent
Johnson et al.

(10) Patent No.: US 12,193,356 B2
(45) Date of Patent: Jan. 14, 2025

(54) SYSTEM AND METHOD FOR ADJUSTING A FORCE APPLIED TO A ROW CLEANER OF A ROW UNIT OF AN AGRICULTURAL IMPLEMENT

(71) Applicant: CNH Industrial America LLC, New Holland, PA (US)

(72) Inventors: Chad M. Johnson, Arlington Heights, IL (US); Trevor Stanhope, Oak Lawn, IL (US)

(73) Assignee: CNH Industrial America LLC, New Holland, PA (US)

( * ) Notice: Subject to any disclaimer, the term of this patent is extended or adjusted under 35 U.S.C. 154(b) by 949 days.

(21) Appl. No.: 17/193,313

(22) Filed: Mar. 5, 2021

(65) Prior Publication Data
US 2022/0279697 A1 Sep. 8, 2022

(51) Int. Cl.
  *A01C 7/20* (2006.01)
  *A01B 49/06* (2006.01)
  *A01C 7/00* (2006.01)

(52) U.S. Cl.
  CPC .............. *A01C 7/205* (2013.01); *A01B 49/06* (2013.01); *A01C 7/006* (2013.01)

(58) Field of Classification Search
  CPC ........... A01C 7/205; A01C 7/201; A01C 7/20; A01C 7/00; A01C 7/006; A01B 49/06; A01B 49/04; A01B 49/00
  See application file for complete search history.

(56) References Cited

U.S. PATENT DOCUMENTS

| | | | |
|---|---|---|---|
| 5,394,946 A | 3/1995 | Clifton et al. | |
| 5,461,995 A | 10/1995 | Winterton | |
| 6,761,120 B2 | 7/2004 | Kovach et al. | |
| 6,776,107 B1 | 8/2004 | Shoup | |
| 7,861,660 B2 | 1/2011 | Martin | |
| 7,946,231 B2 | 5/2011 | Martin et al. | |
| 8,479,669 B2 | 7/2013 | Shoup | |
| 8,813,662 B2 | 8/2014 | Martin | |
| 9,232,687 B2 | 1/2016 | Bassett | |
| 10,091,921 B2 | 10/2018 | Bruck et al. | |
| 10,477,753 B2 | 11/2019 | Achen et al. | |
| 2019/0230842 A1 | 8/2019 | Martin et al. | |

*Primary Examiner* — Christopher J. Novosad
(74) *Attorney, Agent, or Firm* — Rebecca Henkel; Rickard K. DeMille; Peter K. Zacharias

(57) ABSTRACT

A system for adjusting a force acting on a row cleaner of a row unit for an agricultural implement may include a first frame member, a second frame member pivotably coupled to the first frame member, at least one cleaning wheel rotatable relative to the second frame member, a biasing member configured to apply a force against the second frame member along a line of action, an actuator configured to actuate the biasing member to adjust an orientation of the line of action of the force, and a controller configured to selectively control an operation of the actuator. The biasing member extends between first and second biasing ends, with the first biasing end being pivotably coupled to the second frame member. The actuator extends between first and second actuator ends, with the second actuator end being pivotably coupled to the second biasing end.

20 Claims, 6 Drawing Sheets

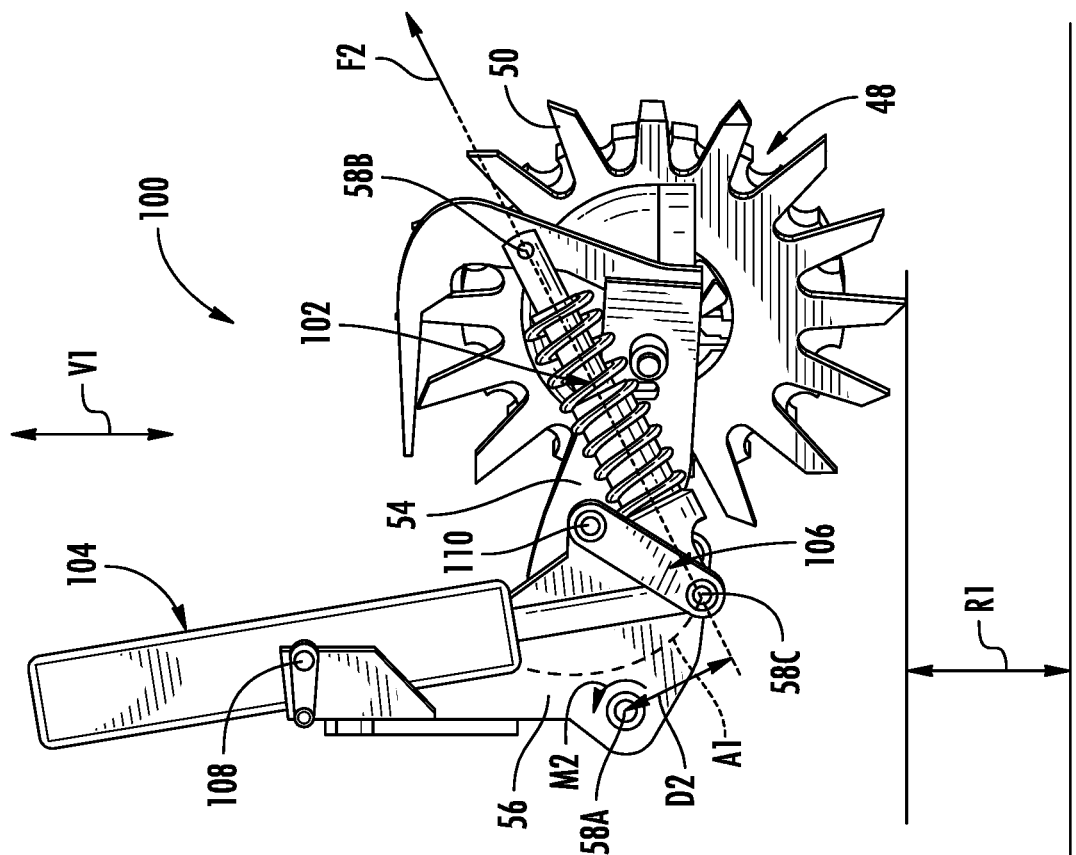
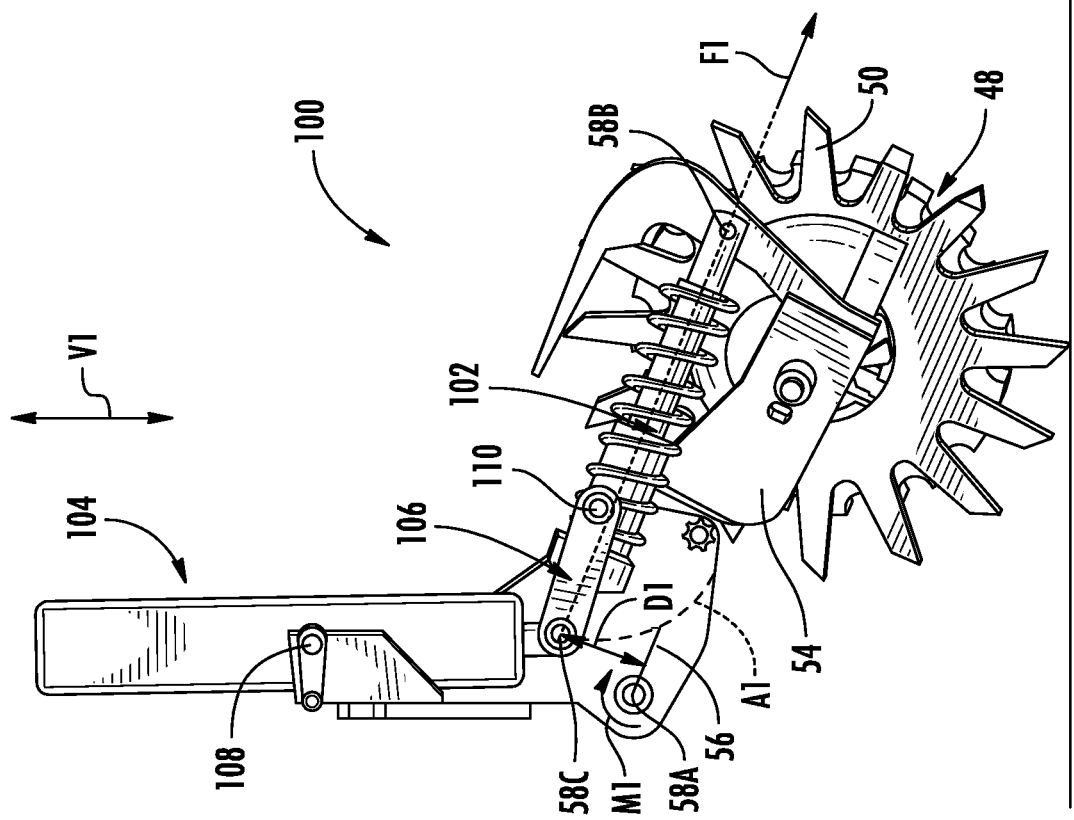
FIG. 4A
FIG. 4B

SYSTEM AND METHOD FOR ADJUSTING A FORCE APPLIED TO A ROW CLEANER OF A ROW UNIT OF AN AGRICULTURAL IMPLEMENT

FIELD OF THE INVENTION

The present disclosure relates generally to agricultural implements and, more particularly, to systems and methods for automatically adjusting a pressure applied to a row cleaner of an agricultural implement.

BACKGROUND OF THE INVENTION

Modern farming practices strive to increase yields of agricultural fields. In this respect, certain agricultural implements, such as seed-planting implements, are towed behind a tractor or other work vehicle for planting. A seed-planting implement typically includes one or more ground engaging assemblies configured to work the soil as the implement is moved across a field. For example, in certain configurations, the implement may include one or more row cleaners that move residue and break up or sweep away clods from the path of subsequent ground engaging assemblies, such as one or more opening assemblies that form a trench or furrow within the soil for receiving seeds as the implement is moved across the field. Furthermore, the implement may also include one or more closing assemblies that close the furrow over seeds while the implement is moved across the field. In this regard, the function(s) of the ground engaging tool(s) requires or relies upon movement of the field materials, such as soil, crop residue, and/or clods, relative to the assemblies.

Typically, the ground engaging assemblies are configured to work the soil in a specific way. For example, when the row cleaners are operating with the correct engagement with the field, there is little to no residue left behind the row cleaners and very little soil is moved by the row cleaners. If too much residue is left behind, the residue may be pushed into the trenches, causing poor seed-to-soil contact, which may affect yields or may cause problems with depth control for the gauge wheels. Similarly, depending on other conditions such as moisture, soil compaction, soil type, and tillage practice within the field, the engagement between the row cleaners and the field may vary. Additionally, the residue coverage and other field conditions across the field may vary, even between row units. As such, it may be beneficial to adjust a force acting on the row cleaners individually to account for such variations. However, conventional systems require manual adjustment to individually adjust the row cleaner forces, which is time consuming. Further, it may be necessary to adjust the force settings multiple times throughout operation of the implement, which multiplies the time for such force adjustment process.

Accordingly, an improved system and method for automatically adjusting a force applied to a row cleaner of an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for adjusting a force acting on a row cleaner of a row unit for an agricultural implement. The system includes a first frame member, a second frame member pivotably coupled to the first frame member at a first pivot joint, and at least one cleaning wheel rotatable relative to the second frame member. The system further includes a biasing member configured to apply a force against the second frame member along a line of action. The biasing member extends between a first biasing end and a second biasing end, with the first biasing end being pivotably coupled to the second frame member at a second pivot joint. Moreover, the system includes an actuator configured to actuate the biasing member to adjust an orientation of the line of action of the force applied by the biasing member. The actuator extends between a first actuator end and a second actuator end, with the second actuator end being pivotably coupled to the second biasing end at a third pivot joint. Additionally, the system includes a controller configured to selectively control an operation of the actuator to adjust the orientation of the line of action of the force applied against the second frame member by the biasing member.

In another aspect, the present subject matter is directed to an agricultural implement. The agricultural implement includes a frame and a plurality of row units supported by the frame, with the plurality of row units being configured to work a field as the implement is moved across the field. Each row unit includes a first frame member supported relative to the frame, a second frame member pivotably coupled to the first frame member at a first pivot joint, and at least one cleaning wheel rotatable relative to the second frame member. Each row unit further includes a biasing member configured to apply a force against the second frame member along a line of action, where the biasing member extends between a first biasing end and a second biasing end, and where the first biasing end is pivotably coupled to the second frame member at a second pivot joint. Each row unit additionally includes an actuator configured to actuate the biasing member to adjust an orientation of the line of action of the force applied by the biasing member against the second frame member, where the actuator extends between a first actuator end and a second actuator end, and where the second actuator end is pivotably coupled to the second biasing end at a third pivot joint. The agricultural implement further includes a controller configured to individually control operation of the actuators of the plurality of row units to adjust the orientations of the lines of action of the forces applied by the biasing members of the plurality of row units against the second frame members.

In an additional aspect, the present subject matter is directed to a method for adjusting a force acting on a row cleaner of a row unit for an agricultural implement, where the row unit has a first frame member, a second frame member pivotably coupled to the first frame member at a first pivot joint, and at least one cleaning wheel rotatable relative to the second frame member. The method includes receiving, by one or more computing devices, an input associated with adjusting a force applied against the second frame member along a line of action. Additionally, the method includes automatically controlling, with the one or more computing devices, an operation of an actuator based at least in part on the input to adjust a position of a biasing member coupled between the actuator and the second frame member. The adjustment of the position of the biasing member results in an orientation of the line of action of the force applied by the biasing member against the second frame member being varied.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 4A and 4B illustrate partial side views of the row cleaner shown in FIG. 2 with the adjustment assembly of FIG. 3 installed relative thereto, particularly illustrating the adjustment assembly at a maximum down force setting and a minimum down force setting, respectively, in accordance with aspects of the present subject matter;

Figure 1:
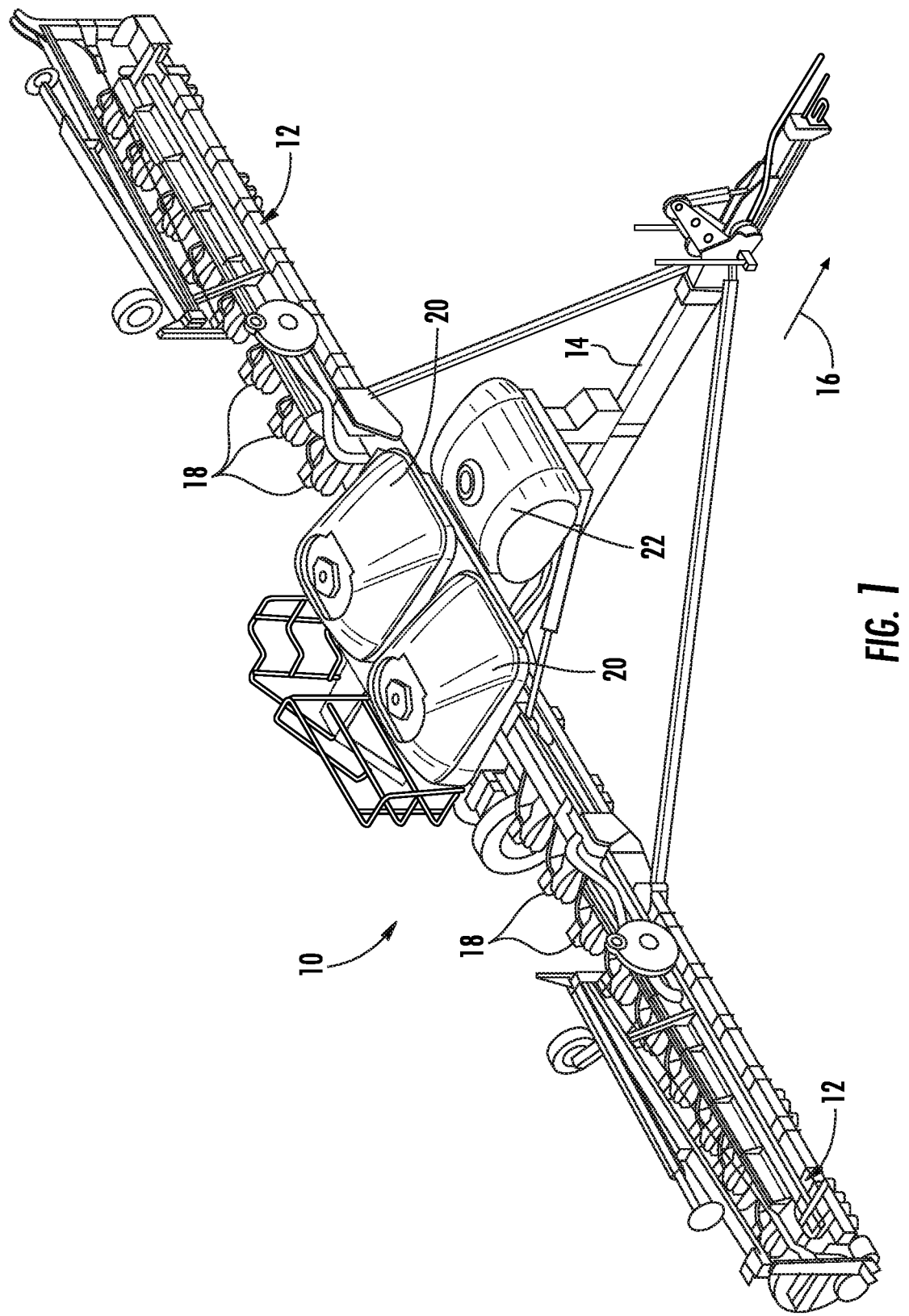
FIG. 1 illustrates a perspective view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for automatically adjusting a force applied to a row cleaner of an agricultural implement. Specifically, in several embodiments, an agricultural implement may include a plurality of row cleaners, where each row cleaner has at least one cleaning wheel configured to clear away residue and clods from a travel path of subsequent ground engaging tools of an associated row unit (e.g., disc openers, seed dispensing tools, closing wheels, etc.). In one example, the cleaning wheel(s) of each row cleaner may be supported by a wheel frame member pivotably coupled to a support frame member that is, in turn, coupled to a frame of the row unit or of the implement. In accordance with aspects of the present subject matter, the row cleaners may have an adjustable force for biasing the cleaning wheel(s). Particularly, each row unit may have a biasing member coupled between an actuator and the wheel frame member, where the actuator is configured to actuate the biasing member to change the direction and/or magnitude of the force applied on the cleaning wheel(s) by the biasing member. More particularly, the actuator may be configured to actuate the biasing member between a first position, where the force applied by the biasing member is equal to a maximum down force on the cleaning wheel(s), and a second position, where the force applied by the biasing member is equal to a maximum lift or minimum down force on the cleaning wheel(s). The actuator of each row unit may be individually controlled to allow for more uniform engagement of the cleaning wheels across the width of the implement. The actuators may be controlled, for example, based on operator input or based on sensed field conditions.

Referring now to the drawings, FIG. 1 illustrates a perspective view of one embodiment of an agricultural implement 10 in accordance with aspects of the present subject matter. It should be appreciated that, although the agricultural implement 10 illustrated herein corresponds to a seed-planting implement or planter, the implement 10 may generally correspond to any suitable equipment or implement having tools configured to engage the soil within a field, such as a tillage implement, a planter, and/or the like.

As shown in FIG. 1, the implement 10 may include a laterally extending toolbar or frame assembly 12 (e.g., including laterally extending, left and right toolbar sections) connected at its middle to a forwardly extending tow bar 14 to allow the implement 10 to be towed by a work vehicle (not shown), such as an agricultural tractor, in a direction of travel (e.g., as indicated by arrow 16 in FIG. 1). The toolbar 12 may generally be configured to support a plurality of seed planting units (or row units) 18. As is generally understood, each row unit 18 may be configured to deposit seeds at a desired depth beneath the soil surface and at a desired seed spacing as the implement 10 is being towed by the work vehicle, thereby establishing rows of planted seeds. In some embodiments, the bulk of the seeds to be planted may be stored in one or more hoppers or seed tanks 20. Thus, as seeds are planted by the row units 18, a pneumatic distribution system may distribute additional seeds from the seed tanks 20 to the individual row units 18. Additionally, one or more fluid tanks 22 may store agricultural fluids, such as insecticides, herbicides, fungicides, fertilizers, and/or the like.

It should be appreciated that, in general, the implement 10 may include any number of row units 18, such as six, eight, twelve, sixteen, twenty-four, thirty-two, or thirty-six row units. In addition, it should be appreciated that the lateral spacing between row units 18 may be selected based on the type of crop being planted. For example, the row units 18 may be spaced approximately thirty inches from one another for planting corn, and approximately fifteen inches from one another for planting soybeans.

It should also be appreciated that the configuration of the seed-planting implement 10 described above and shown in FIG. 1 is provided only to place the present subject matter in an exemplary field of use. Thus, it should be appreciated that the present subject matter may be readily adaptable to any manner of implement configuration. For example, the implement 10 may instead be configured as a tillage implement having one or more ground engaging assemblies capable of experiencing material accumulation, such as one or more tillage assemblies having disc harrows or rolling baskets.

Figure 2:
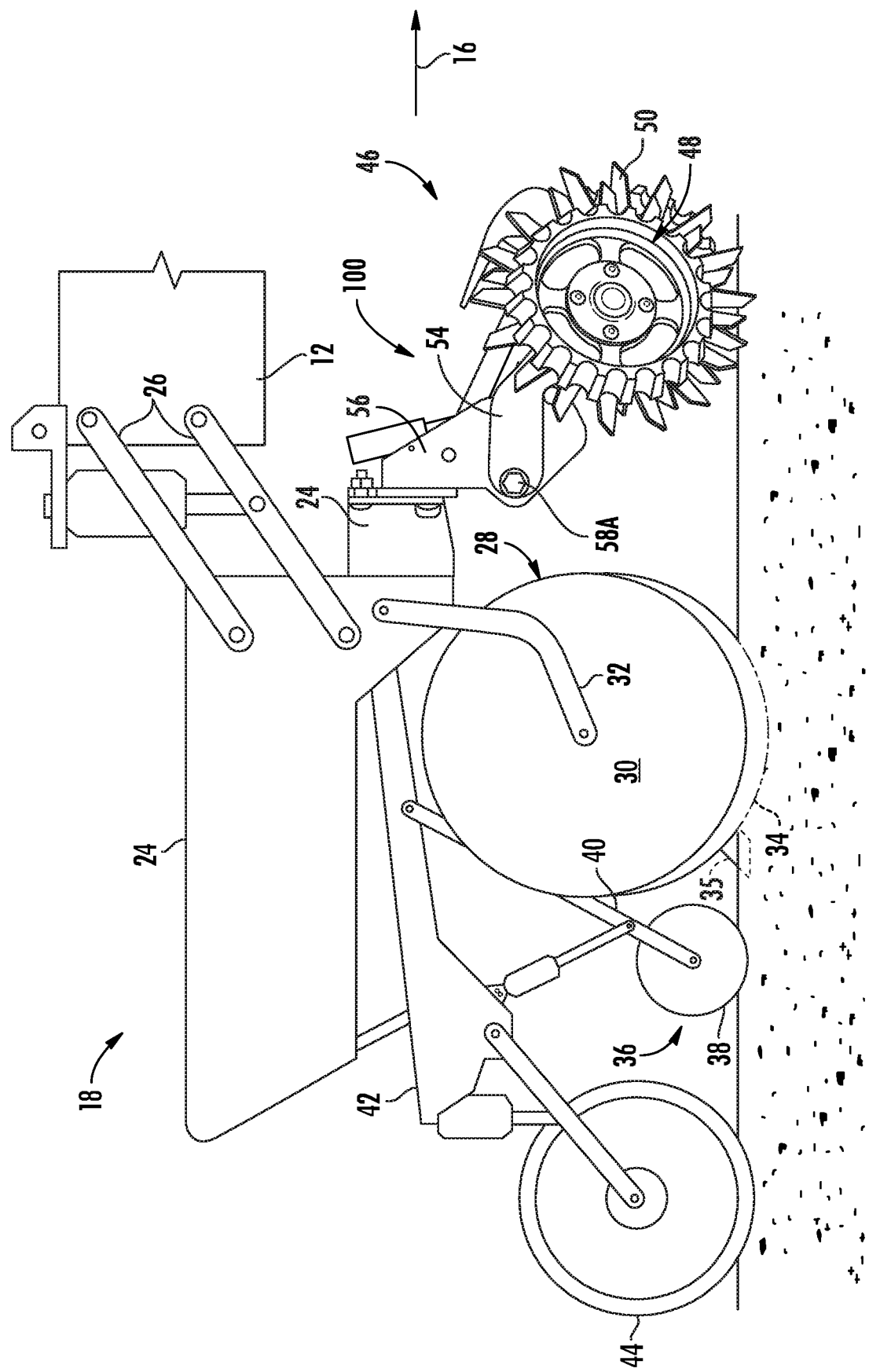
FIG. 2 illustrates a side view of one embodiment of a row unit suitable for use with an agricultural implement in accordance with aspects of the present subject matter, particularly illustrating a row cleaner.

Referring now to FIG. 2, a side view of one embodiment of a row unit 18 is illustrated in accordance with aspects of the present subject matter. As shown, the row unit 18 may include a frame 24 adjustably coupled to the toolbar 12 by links 26. For example, one end of each link 26 may be pivotably coupled to the frame 24, while an opposed end of each link 26 may be pivotably coupled to the toolbar 12. In one embodiment, the links 26 may be parallel. However, it should be appreciated that, in alternative embodiments, the row unit 18 may be coupled to the toolbar 12 in any other suitable manner.

As shown in FIG. 2, the row unit 18 also includes a furrow opening assembly 28. For example, in one embodiment, the furrow opening assembly 28 may include a gauge wheel 30 operatively coupled to the frame 24 of the row unit 18 via a support arm 32. Furthermore, the opening assembly 28 may also include disc openers 34 (only one of which is shown) configured to excavate a furrow or trench in the soil. As is generally understood, the gauge wheel 30 may be configured to engage the top surface of the soil as the implement 10 is moved across the field. In this regard, the height of the disc opener(s) 34 may be adjusted with respect to the position of the gauge wheel 30 to set the desired depth of the furrow being excavated. A delivery tube 35 may be configured to deposit seeds, fertilizer, and/or the like in the trench formed by the disc openers 34. In some embodiments, the delivery tube 35 is positioned at least partially between the gauge wheels 30 and/or between the disc openers 34.

Moreover, as shown, the row unit 18 may include a furrow closing assembly 36. Specifically, in several embodiments, the furrow closing assembly 36 may include a pair of closing discs 38 (only one of which is shown) positioned relative to each other in a manner that permits soil to flow between the discs 38 as the implement 10 is being moved across the field. As such, the closing discs 38 may be configured to close the furrow after seeds have been deposited therein, such as by pushing the excavated soil into the furrow. Furthermore, the furrow closing assembly 36 may include a support arm 40 configured to adjustably couple the closing discs 38 to the frame 24. For example, one end of the support arm 40 may be pivotably coupled to the closing discs 38, while an opposed end of the support arm 40 may be pivotably coupled to a chassis arm 42, which is, in turn, coupled to the frame 24. However, it should be appreciated that, in alternative embodiments, the closing discs 38 may be coupled to the frame 24 in any other suitable manner. Furthermore, it should be appreciated that, in alternative embodiments, the furrow closing assembly 36 may include any other suitable number of closing discs 38, such as one closing disc 38 or three or more closing discs 38. Additionally, the furrow closing assembly 36 may include a press wheel 44 configured to roll over the closed furrow to firm the soil over the seed and promote favorable seed-to-soil contact.

Additionally, as shown in FIG. 2, the row unit 18 may include a row cleaning device or row cleaner 46 positioned at the forward end of the row unit 18 relative to the direction of travel 16. In this regard, the row cleaner 46 may be configured to adjust the surface cleanliness of the field. For instance, the row cleaner 46 may break up and/or sweep away residue, dirt clods, and/or the like from the travel path of components aft of the row cleaner 46 (e.g., disc openers 34), such as before the furrow is formed in the soil. For example, in one embodiment, the row cleaner 46 may include a pair of cleaning wheels 48 (only one of which is shown in FIG. 2), with each wheel 48 having a plurality of tillage points or fingers 50. As such, the wheels 48 may be configured to roll relative to the soil as the implement 10 is moved across the field such that the fingers 50 break up and/or sweep away residue and dirt clods.

More particularly, in one embodiment, the cleaning wheel (s) 48 may be supported for rotation about their respective axes via a wheel frame member 54, with the wheel frame member 54 being pivotably coupled to a support frame member 56 at a pair of first pivot joints 58A (only one of which is shown). For example, one end of the wheel frame member 54 may be configured to support the wheel(s) 48 for rotation relative thereto, while an opposed end of the wheel frame member 54 may be pivotably coupled to the support frame member 56. The support frame member 56 is further coupled or fixed to the support structure or frame 24 of the row unit 18 to support the cleaning wheel(s) 48 relative to the frame 24. However, it should be appreciated that, in alternative embodiments, the cleaning wheel(s) 48 may be supported relative to the frame 24 in any other suitable manner. For instance, the cleaning wheel(s) 48 may be rotatably coupled to a wheel support arm (not shown), with the wheel support arm being coupled to the support frame member 56 by a linkage. The linkage may include a wheel frame member and a linking member. The wheel frame member may extend between a first end and a second end, where the first end of the wheel frame member is rotatably coupled to the support frame member 56 and the second end of the wheel frame member is rotatably coupled to the wheel support arm. Similarly, the linking member may extend between a first end and a second end, where the first end of the linking member is rotatably coupled to the support frame member 56 and the second end of the linking member is rotatably coupled to the wheel support arm. As such, the support frame member 56, the wheel frame member, the linking member, and the wheel support arm may form a four-bar linkage. Furthermore, it should be appreciated that, in alternative embodiments, the row cleaner 46 may include any other suitable number of cleaning wheels 48 and/or may be configured in any other suitable manner.

Additionally, the row unit 18 may include an adjustment assembly for adjusting the engagement between the cleaning wheel(s) 48 and the field. For instance, as shown in FIG. 2, the row unit 18 may include an adjustment assembly 100 for adjusting a biasing force applied to the cleaning wheel(s) 48. More particularly, as will be described in greater detail below, the adjustment assembly 100 may include an actuator (e.g., an electric actuator) for adjusting the position and compression of a biasing member that applies a force against the wheel frame member 54 to provide a desired engagement between the cleaning wheel(s) 48 and the field. By changing the position and compression of the biasing member, the direction and magnitude of the biasing force acting against the wheel frame member 54 is adjustable to change the engagement between the cleaning wheel(s) and the field. Such biasing member may also damp external forces applied to the cleaning wheel(s) 48 (e.g., from an obstacle in the field) to prevent excessive force from being transmitted via the cleaning wheel(s) 48 to the actuator.

Figure 3:
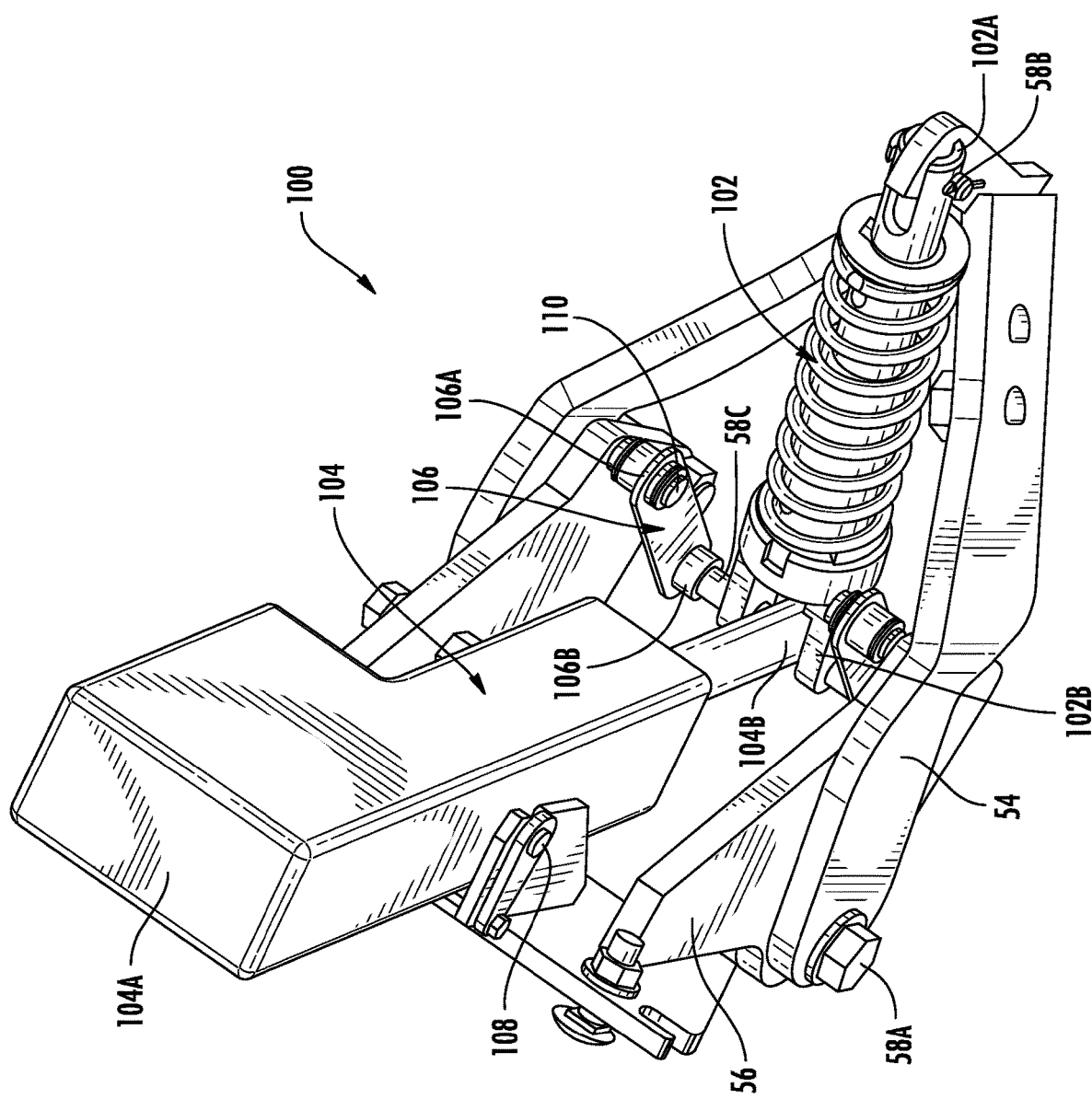
FIG. 3 illustrates a perspective view of one embodiment of an adjustment assembly suitable for use with a row unit in accordance with aspects of the present subject matter.
Figure 5:
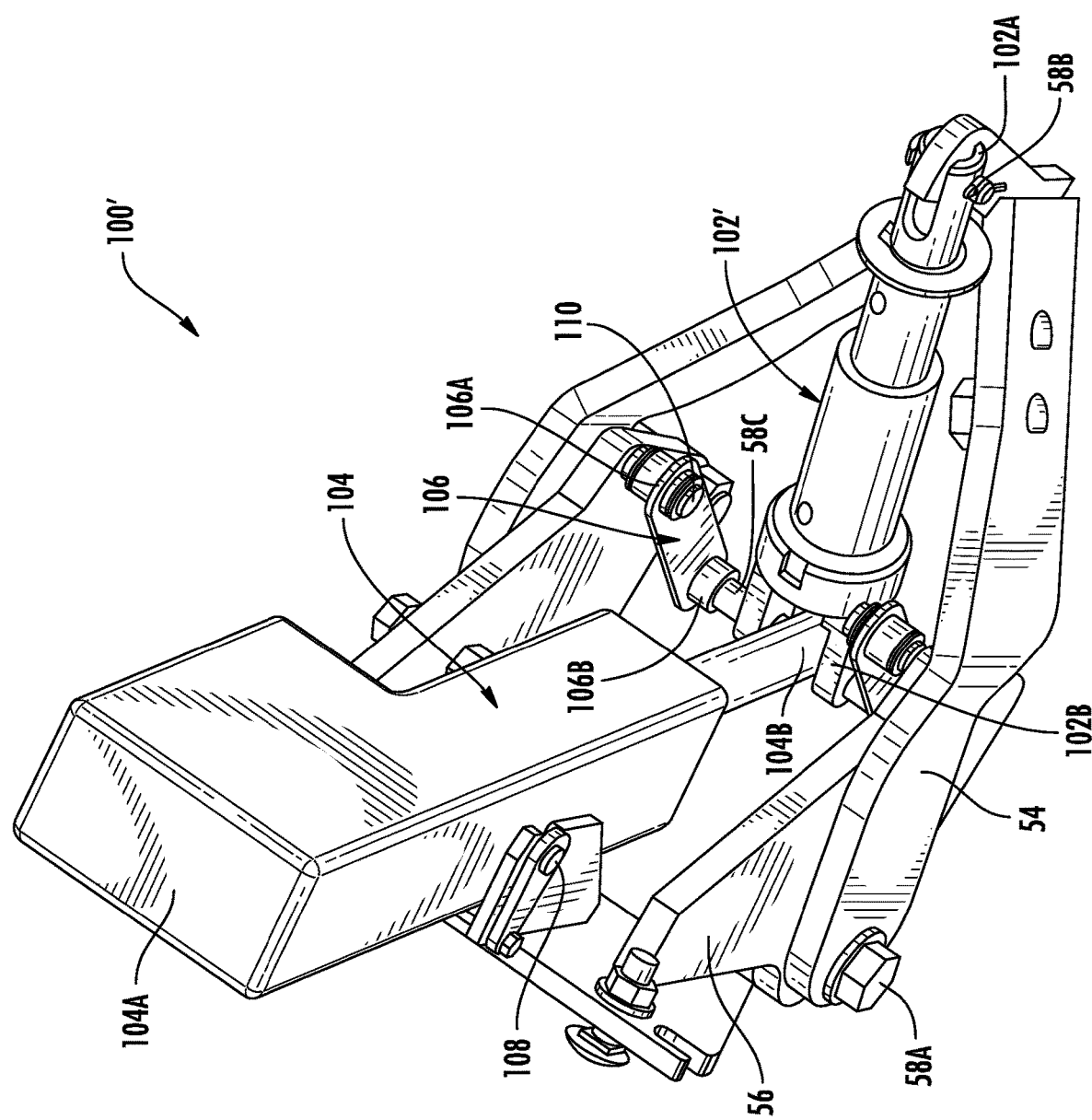
FIG. 5 illustrates a perspective view of another embodiment of an adjustment assembly suitable for use with a row unit in accordance with aspects of the present subject matter.

Referring now to FIGS. 3-5, various views of embodiments of an adjustment assembly 100 configured for use with a row cleaner (e.g., the row cleaner 46 shown in FIG. 2) are illustrated in accordance with aspects of the present subject matter. Specifically, FIG. 3 illustrates a perspective view of one embodiment of the adjustment assembly shown in FIG. 2 with the cleaning wheels 48 removed for illustrative purposes. Moreover, FIGS. 4A-4B illustrate partial, side views of the row cleaner of FIG. 2 when the adjustment assembly of FIG. 3 is at a maximum down force setting and a minimum down force setting, respectively, with one of the cleaning wheels 48, part of the wheel frame member 54, and part of support frame member 56 being removed for illustrative purposes. Additionally, FIG. 5 illustrates a perspective view of another embodiment of the adjustment assembly shown in FIG. 2 with the cleaning wheels 48 removed for illustrative purposes.

As shown in FIG. 3, in one embodiment, the adjustment assembly 100 includes a biasing member 102, an actuator 104, and a pair of crank members or levers 106. In general, as indicated above, the biasing member 102 is configured to provide a biasing force against the wheel frame member 54, where the biasing force essentially controls the engagement between the cleaning wheel(s) 48 (FIG. 2) and the field surface. The actuator 104 may be coupled to the biasing member 102 such that extension and retraction of the actuator 104 adjusts the positioning of the biasing member 102 which adjusts the biasing force and thus, the engagement between the cleaning wheel(s) 48 (FIG. 2) and the field surface. Particularly, as shown in FIG. 3, the biasing member 102 extends between a first biasing end 102A and a second biasing end 102B, where the first biasing end 102A is pivotably coupled to the wheel frame member 54 at a second pivot joint 58B. Similarly, the actuator 104 extends between a first actuator end 104A and a second actuator end 104B, where the second actuator end 104B is pivotably coupled to the second biasing end 102B of the biasing member 102 at a third pivot joint 58C. Further, in some embodiments, the actuator 104 is pivotably coupled to the support frame member 56 proximate the first actuator end 104A about a pivot point 108. However, in other embodiments, the actuator 104 may be coupled to any suitable structure at any suitable location, such as below the first pivot joint 58A.

As the actuator 104 extends and retracts, the second biasing end 102B of the biasing member 102 is moved, which adjusts the biasing force applied by the biasing member 102. The levers 106 may be configured to limit the movement of the biasing member 102 and the actuator 104 as the actuator 104 extends and retracts. More particularly, each lever 106 extends between a first lever end 106A and a second lever end 106B, where the first lever end 106A is pivotably coupled to the support frame member 56 at a pivot joint 110 and the second lever end 106B is pivotably coupled to at least one of the second biasing end 102B of the biasing member 102 or the second actuator end 104B at the third pivot joint 58C. For example, in one embodiment, the third pivot joint 58C may include a pin(s) that at least partially extends through openings defined adjacent to the second lever end 106B of each lever 106, the second biasing end 102B of the biasing member 102, and the second actuator end 104B of the actuator 104. The second actuator end 104B of the actuator 104 travels along an arc A1 (FIGS. 4A and 4B) as the levers 106 pivot about pivot joint 110 with extension and retraction of the actuator 104. The arc A1 is generally defined about pivot joint 110 and has a radius equal to the distance between the third pivot joint 58C and the pivot joint 110.

As will be described in greater detail below, when a line of action of the force applied by the biasing member 102 is oriented to extend from a first side of the first pivot joint 58A, the force applied by the biasing member 102 creates a moment on the wheel frame member 54 in a first direction. When a line of action of the force applied by the biasing member 102 is oriented to extend from an opposite, second side of the first pivot joint 58A, the force applied by the biasing member 102 creates a moment on the wheel frame member 54 in an opposite direction. Generally, the smaller a moment arm defined between the line of action of the force applied by the biasing member 102 and the first pivot joint 58A, the smaller the magnitude of the moment applied by the biasing member 102 on the wheel frame member 54.

For instance, as shown in FIG. 4A, the actuator 104 is in a fully retracted position, the biasing member 102 is in a first position. Particularly, in the first position of the biasing member 102, a line of action of a force vector F1 (hereinafter referred to as "force F1") of the biasing member 102 extending through the second pivot joint 58B and the third pivot joint 58C is positioned or extends above the center of the first pivot joint 58A such that a point along the line of action of the force vector F1 is spaced directly vertically above the first pivot joint 58A. More particularly, in the embodiment shown, the biasing member 102 is a compression spring that provides the force F1 in the direction shown such that a positive or clockwise moment M1 is generated about the first pivot joint 58A, equal to the force F1 multiplied by the moment arm or perpendicular distance D1 from the first pivot joint 58A to the line of action of the force F1. As such, the biasing member 102 applies a downwardly oriented force against the wheel frame member 54. However, in other embodiments, the biasing member 102 may be an extension spring that provides an extension force in the opposite direction of force F1. In such embodiments, the extension force of the biasing member 102 creates a negative or counterclockwise moment about the first pivot joint 58A, thereby allowing the biasing member 102 to apply an upwardly oriented force against the wheel frame member. In this regard, the adjustment assembly 100 is generally configured to provide a maximum down force setting (in the case of a compression biasing force) or a minimum down force or maximum lift force setting (in the case of an extension biasing force) for the row cleaner 46 when the actuator 104 is fully retracted, given that full retraction of the actuator 104 results in the line of action of the biasing member 102 being positioned at its maximum distance (i.e., distance D1) above the first pivot joint 58A in the vertical direction V1.

As the actuator 104 is extended from the position shown in FIG. 4A, the second biasing end 102B of the biasing member 102 and the second actuator end 104B of the actuator 104 move downwardly with the second lever ends 106B of the levers 106 along the arc A1. As the second biasing end 102B of the biasing member 102 is moved along the arc A1, the relative positioning between the line of action of the biasing force and the first pivot joint 58A changes, which ultimately changes the magnitude and the direction of the force applied by the biasing member 102. For instance, with the second biasing end 102B being moved downward along the vertical direction V1 from the position shown in FIG. 4A with extension of the actuator 104, the magnitude of the downward force (in the case of a compressive biasing force) or lift force (in the case of an extension biasing force) applied by the biasing member 102 decreases as the biasing member 102 takes on a more horizontal orientation (e.g., as the perpendicular distance between the line of action of the force of the biasing member 102 and the first pivot joint 58A decreases). When the perpendicular distance between the line of action of the biasing force of the biasing member 102 and the first pivot joint 58A is equal to zero (e.g., when the line of action of the biasing force of the biasing member 102 extends through the center of the first pivot joint 58A), the biasing member 102 applies essentially no moment about the first pivot joint 58A such that the biasing member 102 applies no vertically oriented force against the wheel frame member 54. When the actuator 104 is further extended such that the line of action of the force of the biasing member is positioned below the center of the first pivot joint 58A along the vertical direction V1, the biasing member 102 begins to apply an upwardly oriented or lift force (in the case of a compressive biasing force) or a downwardly oriented force (in the case of an extension biasing force) on the wheel frame member 54. Such configuration between the line of action of the biasing member 102 and the first pivot joint 58A is generally referred to as an "over-center" configuration as the line of action passes across the first pivot joint 58A.

When the actuator 104 is fully extended, as shown in FIG. 4B, the biasing member 102 is positioned such that its line of action extends below the center of the first pivot joint 58A along the vertical direction V1 such that a point along the line of action of the force vector F1 is spaced directly vertically below the first pivot joint 58A. With this arrangement, the adjustment assembly 100 is generally configured to provide a maximum lift force or minimum down force setting (in the case of a compressive biasing force) or a maximum down force setting (in the case of an extension biasing force) for the row cleaner 46 when the actuator 104 is fully extended given that full extension results in the line of action of the biasing member 102 being positioned at its maximum distance below the first pivot joint 58A along the vertical direction V1 due to the configuration of the actuator 104 and the levers 106.

Further, depending on the magnitude of the force provided by the biasing member 102, the position of the cleaning wheel 48 may also be changed along the vertical direction V1. For instance, when biasing member 102 is positioned by the actuator such that it may provide a lift force equal to or greater than a weight of the cleaning wheel 48, the cleaning wheel 48 may be raised to its upper height limit or stop. For instance, the cleaning wheel 48 may be raised from the position shown in FIG. 4A towards the position shown in FIG. 4B. As such, a vertical height range R1 may be defined for the cleaning wheel 48 in which the wheel 48 is disposed at a minimum height (e.g., as shown in FIG. 4A) when the adjustment assembly 100 is arranged to provide a lift force that cannot overcome the weight of the cleaning wheel 48 or a down force and is disposed at a maximum height (as shown in FIG. 4B) when the adjustment assembly 100 is arranged to provide a lift force that overcomes the weight of the cleaning wheel 48.

It should be appreciated that, in one embodiment, the biasing member 102 is configured as a spring (e.g., a compression spring, an extension spring, a spring over guiding cylinder, and/or the like). However, the biasing member 102 may be configured as any other suitable member or system for providing a biasing force on the wheel frame member 54. For instance, an alternative embodiment of an adjustment assembly 100' is illustrated in FIG. 5. The adjustment assembly 100' is configured substantially similarly to the adjustment assembly 100 of FIG. 3, except that the biasing member 102' is configured as a pneumatic or hydraulic cylinder. Parts of the adjustment assembly 100' that are substantially similar or the same as parts of the adjustment assembly 100 are indicated with the same reference numeral. Similarly, it should be appreciated that, in one embodiment, the actuator 104 is configured as an electric actuator, such as an electric linear actuator configured to convert rotational motion from a motor into linear translation. By configuring the actuator 104 as an electric actuator, the individual adjustment of multiple row cleaners 46 may be more simply and cost effectively implemented over hydraulic or pneumatic adjustment of row cleaners 46. However, in other embodiments, the actuator 104 may be configured as any other suitable actuator for moving the biasing member 102, 102', including hydraulic or pneumatic cylinders.

It should additionally be appreciated that while the adjustment assembly 100, 100' is described as actuating the biasing member 102, 102' such that the line of action of the biasing member 102, 102' passes or crosses over the first pivot joint 58A such that the line of action extends above the first pivot joint 58A in a first position of the biasing member 102, 102' and below the first pivot joint 58A in a second position of the biasing member 102, 102', the adjustment assembly 100, 100' may be configured to actuate the biasing member 102, 102' between any two positions such that the line of action of the force vector of the biasing member 102, 102' passes across the first pivot member 58A to change direction of the moment generated by the biasing member 102, 102'. For example, in some embodiments, the biasing member 102, 102' may be actuated between a first position, where the line of action slopes upwardly from left to right, and a second position, where the line of action slopes upwardly from right to left, with the line of action having at point above the first pivot joint 58A in both the first and second positions or below the first pivot joint 58B in both the first and second positions. In such embodiments, the moment about the first pivot joint 58A is in a first direction when the biasing member 102, 102' is in the first position and in a second, opposite direction when the biasing member 102, 102' is in the second position.

Figure 6:
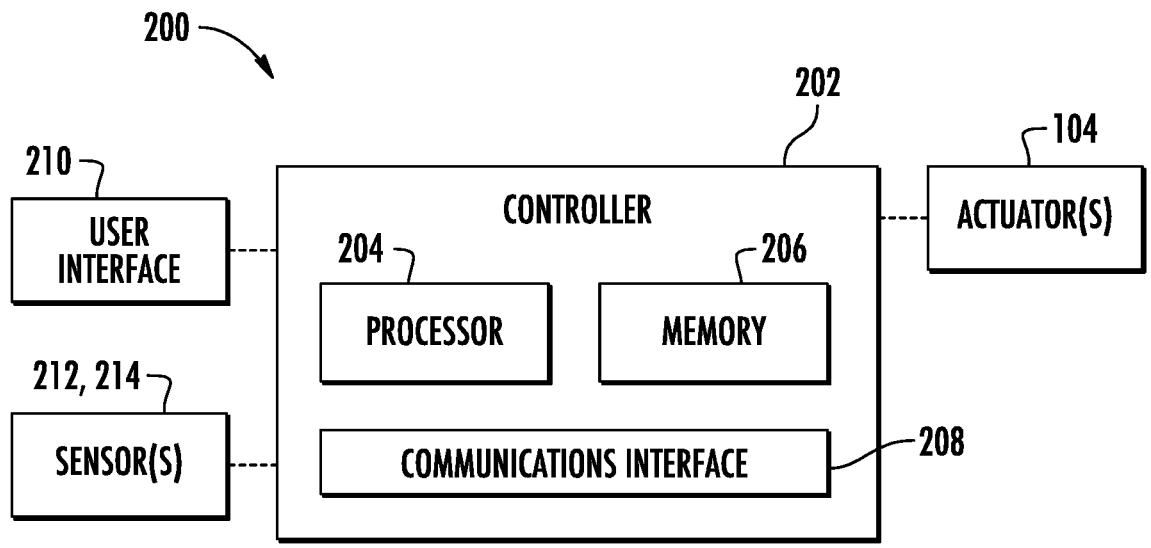
FIG. 6 illustrates a schematic view of a system for automatically adjusting a force applied to a row cleaner of an agricultural implement in accordance with aspects of the present subject matter.

Referring now to FIG. 6, a schematic view of one embodiment of a system 200 for automatically adjusting a force applied to a row cleaner of an agricultural implement is illustrated in accordance with aspects of the present subject matter. In general, the system 200 will be described herein with reference to the implement 10 described above with reference to FIG. 1, the row unit 46 of FIG. 2, and the adjustment assemblies 100, 100' described with reference to FIGS. 3-5. However, it should be appreciated by those of ordinary skill in the art that the disclosed system 200 may generally be utilized with agricultural implements having any other suitable implement configuration, with row units having any other suitable assembly configuration, and/or with adjustment assemblies having any other suitable configuration. Additionally, it should be appreciated that, for purposes of illustration, communicative links or electrical couplings of the system 200 shown in FIG. 6 are indicated by dashed lines.

As shown in FIG. 6, the system 200 may include a controller 202 communicatively coupled to one or more components of the agricultural implement 10, such as one or more actuators (e.g., actuator(s) 104) used to actuate the associated biasing member(s) (e.g., biasing members 102, 102'). Further, in some embodiments, the system 200 may be coupled to a user interface 210. The user interface 210 described herein may include, without limitation, any combination of input and/or output devices that allow an operator to provide inputs to the controller 202 and/or that allow the controller 202 to provide feedback to the operator, such as a keyboard, keypad, pointing device, buttons, knobs, touch sensitive screen, mobile device, audio input device, audio output device, and/or the like. Additionally, in some embodiments, the system 200 includes one or more field condition sensors 212 (hereinafter referred to as "sensors 212") that are used to detect one or more parameters associated with field conditions of a field (e.g., residue coverage, size, moisture content, soil type, clods, etc.) and/or one or more position sensors 214 (hereinafter referred to as "sensors 214") that are used to detect one or more parameters associated with the position of the row cleaner(s) 46 (e.g., distance between the cleaning wheel(s) 48 and a surface of a field).

In general, the controller 202 may include any suitable processor-based device known in the art, such as a computing device or any suitable combination of computing devices. Thus, in several embodiments, the controller 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the controller 202 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the methods and algorithms that will be described herein. In addition, the controller 202 may also include various other suitable components, such as a communications circuit or module, one or more input/output channels, a data/control bus and/or the like.

In several embodiments, the controller 202 may correspond to an existing controller of the implement 10 and/or an existing controller of a work vehicle configured to tow the implement 10. However, it should be appreciated that, in other embodiments, the controller 202 may instead correspond to a separate processing device. For instance, in one embodiment, the controller 202 may form all or part of a separate plug-in module that may be installed on the agricultural implement 10 or the work vehicle to allow for the disclosed system and method to be implemented without requiring additional software to be uploaded onto existing control devices of the work vehicle or the agricultural implement 10.

In some embodiments, the controller 202 may include a communications module or interface 208 to allow for the controller 202 to communicate with and/or electronically control any of the various system components described herein. For instance, one or more communicative links or interfaces (e.g., one or more data buses) may be provided between the communications interface 208 and the actuator(s) 104 to allow the controller 202 to control the operation of one or more components of the actuator(s) 104. Further, one or more communicative links or interfaces (e.g., one or more data buses) may be provided between the communications interface 208 and a user interface (e.g., user interface 210) to allow operator inputs to be received by the controller 202 and/or the allow the controller 202 to control the operation of one or more components of the user interface 210. Additionally, one or more communicative links or interfaces (e.g., one or more data buses) may be provided between the communications interface 208 and the sensor(s) 212, 214 to allow data to be transmitted from the sensor(s) 212, 214 to the controller 202.

As described above, the actuator(s) 104 may be selectively controllable to actuate the biasing member(s) 102, 102' to adjust a force applied by the biasing member(s) 102, 102' against the associated row cleaner 46 of the agricultural implement 10. In one embodiment, the controller 202 may be configured to automatically control the operation of the actuator(s) 104 based at least in part on an input received from an operator (e.g., via the user interface 210) to adjust the force applied by the biasing member(s) 102, 102'. For instance, the controller 202 may receive an operator input via the user interface 210 associated with increasing or decreasing the force applied by the biasing member(s) 102, 102' (e.g., an input to lower or raise the cleaning wheel(s) 48) and, in return, control the operation of the actuator(s) 104, to actuate the biasing member(s) 102, 102' accordingly. For example, if the input is associated with increasing the down force (or decreasing a lift force) applied by the biasing member(s) 102, 102' (e.g., an input to lower the cleaning wheel(s) 48, increase the engagement between the cleaning wheel(s) 48 and the field, and/or the like), the controller 202 may be configured to control the operation of the actuator(s) 104 to actuate the biasing member(s) 102, 102' towards the first position (FIG. 4A). Similarly, if the input is associated with increasing a lift force (or decreasing a down force) applied by the biasing member(s) 102, 102' (e.g., an input to raise the cleaning wheel(s) 48, decrease the engagement between the cleaning wheel(s) 48 and the field, and/or the like), the controller 202 may be configured to control the operation of the actuator(s) 104 to actuate the biasing member(s) 102, 102' towards the second position (FIG. 4B). The user interface 210 may be configured in any suitable way to allow the operator input to indicate the desired change in the force applied by the biasing member(s) 102, 102'. For instance, the user interface 210 may include inputs for increasing or decreasing the down or lift force, inputs for raising or lowering the cleaning wheel(s) 48, and/or the like. Such inputs may indicate discrete increments or continuous adjustments, and/or different predetermined settings for the force between the maximum down force (FIG. 4A) and the maximum lift force (FIG. 4B).

In some embodiments, the controller 202 may be configured to actively control the operation of the actuator(s) 104 based at least in part on data indicative of field conditions. For instance, when there is more residue, larger residue and/or clods, and/or more moisture in an area of the field, it may be beneficial to actively adjust the force acting on the cleaning wheel(s) 48 to increase the down force (or reduce the lift force) and, vice versa, when there is less residue, smaller residue and/or clods, and/or less moisture in an area of the field, it may be beneficial to actively adjust the force acting on the cleaning wheel(s) 48 to reduce the down force (or increase the lift force).

Similarly, in some embodiments, the controller 202 may be configured to actively control the operation of the actuator(s) 104 based at least in part on data indicative of the position of the row cleaner(s) 46. For instance, the position of the cleaning wheel(s) 48 relative to a surface of a field across which the row cleaner(s) 46 are moving may be monitored relative to a position threshold. For example, when the cleaning wheel(s) 48 are positioned higher than the position threshold relative to the field surface, it may be beneficial to actively adjust the force acting on the cleaning wheel(s) 48 to increase the down force (or reduce the lift force) and, vice versa, when the cleaning wheel(s) 48 are positioned lower than the position threshold relative to the field surface, it may be beneficial to actively adjust the force acting on the cleaning wheel(s) 48 to reduce the down force (or increase the lift force).

In one embodiment, the controller 202 may be configured to receive the data indicative of the field conditions (e.g., residue coverage, residue and/or clod size, and/or moisture content within the field) from the sensor(s) 212 and/or a position of the row cleaner 46 (e.g., the distance between the cleaning wheel(s) 48 and a surface of the field) from the sensor(s) 214. The sensor(s) 212, 214 may be mounted at any suitable location on the implement 10 (e.g., to the implement frame assembly 12, the row unit frame(s) 24, and/or the like) or the work vehicle towing the implement 10 to generate data indicative of the monitored conditions as the implement 10 is moved across the field. However, it should be appreciated that the controller 202 may be configured to receive data indicative of the monitored conditions from any other suitable source. For instance, in some embodiments, the data indicative of the monitored field conditions may be historical data generated during a previous agricultural operation within the field (e.g., a harvesting operation).

The sensor(s) 212, 214 may include any suitable type of sensing device(s) for generating data indicative of the monitored conditions. For example, in several embodiments, the sensor(s) 212 may correspond to a camera(s) (e.g., RGB, multispectral, infrared, thermal, etc.) for generating data indicative of the monitored field conditions (e.g., images, point cloud data, and/or the like). In some embodiments, the sensor(s) 212 may correspond to an infrared sensor(s), a radar sensor(s), a Light Detection and Ranging (LIDAR) sensor(s), etc. However, in alternative embodiments, the sensor(s) 212 may correspond to any other suitable device(s) or combination of devices. Similarly, in several embodiments, the sensor(s) 214 may correspond to non-contact sensors configured to generate data indicative of the position of the row cleaner(s) 46 (e.g., distance between the sensor 214 and the field surface), such as ultrasonic senor(s), radar sensor(s), laser distance sensor(s), infrared sensor(s), and/or the like. Alternatively, or additionally, the sensor(s) 214 may correspond to angular sensor(s) configured to monitor the angular position of the wheel frame member 54 relative to support frame member 56, and/or the like which may be indicative of the position of the cleaning wheel(s) 48 and the field surface. However, in alternative embodiments, the sensor(s) 214 may correspond to any other suitable device(s) or combination of devices and/or may be configured to provide any other suitable data indicative of the position of the row cleaner(s) 46.

The controller 202 may include any suitable data processing techniques to determine the field conditions within the field based at least in part on the data received from the sensor(s) 212 and the position of the row cleaner(s) 46 based at least in part on the data received from the sensor(s) 214. In some embodiments, for example, the controller 202 may analyze images of the field from the sensor(s) 212 using any suitable image processing techniques. Suitable processing or analyzing techniques may include performing a spatial or spectral analysis on received images or image data. For instance, geometric or spatial processing algorithms may differentiate the shape and/or average size of residue from soil particles. Similarly, shape detection and/or edge-finding or perimeter-finding algorithms may be used that differentiate clods from soil and/or residue. Additionally, if the sensor(s) 212 comprises a multi-spectral camera(s), spectral processing algorithms may be used to differentiate the spectral reflectance of residue from the spectral reflectance of soil and/or to estimate the moisture content of the field.

The controller 202 may further be configured to compare the field conditions detected within the field based on the data received from the sensor(s) 212 to one or more field condition thresholds and/or to compare the position of the row cleaner(s) 46 detected based on the data received from the sensor(s) 214 to one or more position thresholds to determine an appropriate force for biasing the cleaning wheel(s) 48. For example, when the controller 202 determines that the residue coverage, residue and/or clod size, and/or moisture content within the field exceeds a maximum associated threshold(s), and/or when the controller 202 determines that the position of the row cleaner 46 (e.g., the cleaning wheel(s) 48) is higher than a highest desired position threshold, the controller 202 may automatically control the operation of the actuator(s) 104 to actuate the biasing member(s) 102, 102' to increase the down force (or reduce the lift force) such that the cleaning wheel(s) 48 are lowered along the vertical direction. Similarly, when the controller 202 determines that the residue coverage, residue and/or clod size, and/or moisture content within the field falls below a minimum associated threshold(s), and/or when the controller 202 determines that the position of the row cleaner 46 (e.g., the cleaning wheel(s) 48) is lower than a lowest desired position threshold, the controller 202 may automatically control the operation of the actuator(s) 104 to actuate the biasing member(s) 102, 102' to reduce the down force (or increase the lift force) such that the cleaning wheel(s) 48 are raised along the vertical direction. It should be appreciated that the controller 202 may be configured to compare the field conditions and/or the position of the row cleaner(s) 46 to any suitable number of thresholds. Further, it should be appreciated that, in some embodiments, such thresholds may be predetermined and stored within the memory 206 of the controller 202. Additionally, it should be appreciated that any other suitable field conditions or relative positioning of the row cleaner(s) 46 may be used to adjust the biasing force.

It should additionally be appreciated that the actuator(s) 104 of multiple row units 18 may be controlled individually to allow different biasing forces for different row cleaners 46. Alternatively, or additionally, one or more of the actuator(s) 104 of multiple row units 18 may be controlled together so that the biasing force is the same for each row unit 18 within such grouping.

As described, the system 200 allows for a more efficient way to individually adjust the biasing force acting on one or more row cleaners 46 at a time based on operator input, which improves the overall efficiency of a seed planting operation. Such system 200 also allows for active automatic adjustment of the biasing force acting on one or more row cleaners 46 at a time based on the determined field conditions, which improves the overall effectiveness of the row cleaner(s) 46.

Figure 7:
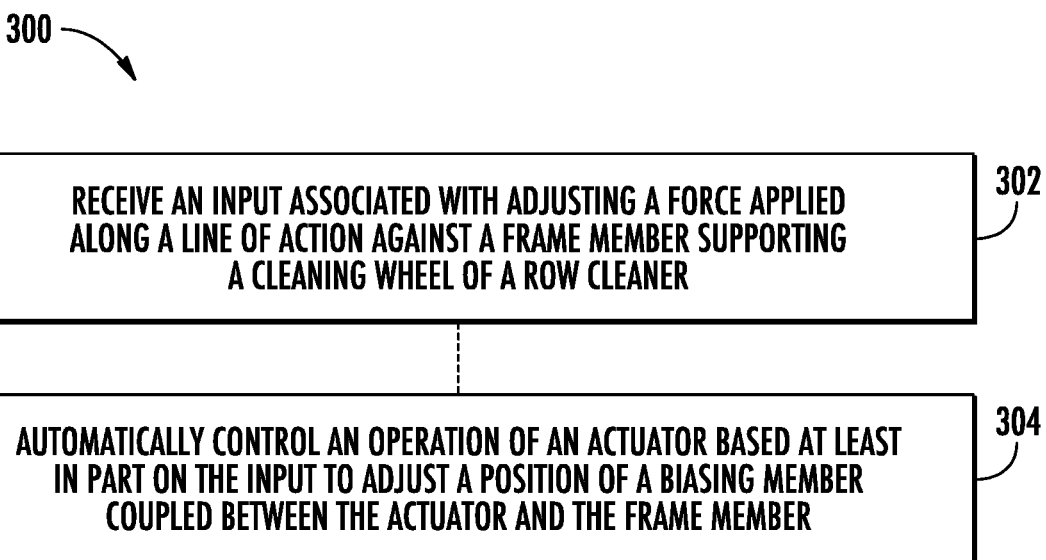
FIG. 7 illustrates a flow diagram of one embodiment of a method for automatically adjusting a force applied to a row cleaner of an agricultural implement in accordance with aspects of the present subject matter.

Referring now to FIG. 7, a flow diagram of one embodiment of a method 300 for automatically adjusting a force applied to a row cleaner of an agricultural implement is illustrated in accordance with aspects of the present subject matter. In general, the method 300 will be described herein with reference to the implement 10 described above with reference to FIG. 1, the row unit 46 of FIG. 2, the adjustment assemblies 100, 100' described with reference to FIGS. 2-5, and the system 200 described with reference to FIG. 6. However, it should be appreciated by those of ordinary skill in the art that the disclosed method 300 may be implemented with agricultural implements having any other suitable implement configuration, with row units having any other suitable assembly configuration, with adjustment assemblies having any other suitable configuration, and/or with systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method 300 may include receiving an input associated with adjusting a force applied along a line of action against a frame member supporting a cleaning wheel of a row cleaner. For instance, as described above, the input may be an operator input received by the controller 202 (e.g., via the user interface 210) that is associated with a request to adjust (e.g., change the magnitude and/or direction of) the force applied on or against the wheel frame member 54 of a row cleaner 46. Alternatively, or additionally, the input received by the controller 202 may be indicative of a field condition(s) within a field which is, in turn, indicative of a need to adjust (e.g., change the magnitude and/or direction of) the force applied on or against the wheel frame member 54 of the row cleaner 46.

Additionally, at (304), the method 300 may include automatically controlling an operation of an actuator based at least in part on the input to adjust a position of a biasing member coupled between the actuator and the frame member. For instance, as indicated above, the controller 202 may be configured to automatically control the operation of the actuator(s) 104 to actuate or move the biasing member(s) 102, 102' based on the received input to adjust the (e.g., change the magnitude and/or direction of) the force applied against the wheel frame member 54 of a row cleaner 46.

It is to be understood that the steps of the method 300 are performed by the computing system 200 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 200 described herein, such as the method 300, is implemented in software code or instructions which are tangibly stored on a tangible computer readable medium. The computing system 200 loads the software code or instructions via a direct interface with the computer readable medium or via a wired and/or wireless network. Upon loading and executing such software code or instructions by the computing system 200, the computing system 200 may perform any of the functionality of the computing system 200 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for adjusting a force acting on a row cleaner of a row unit for an agricultural implement, comprising:
    a first frame member;
    a second frame member pivotably coupled to the first frame member at a first pivot joint;
    at least one cleaning wheel rotatably coupled to the second frame member;
    a biasing member configured to apply a force against the second frame member along a line of action, the biasing member extending between a first biasing end and a second biasing end, the first biasing end being pivotably coupled to the second frame member at a second pivot joint;
    an actuator configured to actuate the biasing member to adjust an orientation of the line of action of the force applied by the biasing member against the second frame member, the actuator extending between a first actuator end and a second actuator end, the second actuator end being pivotably coupled to the second biasing end at a third pivot joint; and
    a controller configured to selectively control an operation of the actuator to adjust the orientation of the line of action of the force applied against the second frame member by the biasing member.

2. The system of claim 1, further comprising a lever extending between a first lever end and a second lever end, the first lever end being pivotably coupled to the first frame member, the second lever end being pivotably coupled at the third pivot joint to at least one of the second biasing end of the biasing member or the second actuator end of the actuator.

3. The system of claim 1, wherein the actuator is configured to selectively actuate the biasing member between a first position and a second position, the line of action of the biasing member spaced further from the first pivot joint when the biasing member is in the first position than in the second position, the biasing member applying a greater moment to the second frame member about the first pivot joint in a first direction when the biasing member is in the first position than in the second position.

4. The system of claim 1, wherein the actuator is configured to selectively actuate the biasing member between a first position and a second position,
    wherein the biasing member is configured to apply a moment to the second frame member about the first pivot joint in a first direction when the biasing member is in the first position, and
    wherein the biasing member is configured to apply a moment to the second frame member about the first pivot joint in a second direction when the biasing member is in the second position, the second direction being opposite the first direction.

5. The system of claim 4, wherein the line of action of the biasing member extends above the first pivot joint when the biasing member is in the first position, and the line of action of the biasing member extends below the first pivot joint when the biasing member is in the second position.

6. The system of claim 4, wherein, when the actuator actuates the biasing member to a third position between a first position and a second position, the line of action of the biasing member extends through the first pivot joint and the biasing member applies a moment equal to zero about the first pivot joint.

7. The system of claim 1, wherein the actuator comprises an electric linear actuator.

8. The system of claim 1, wherein the biasing member comprises a spring or a pneumatic cylinder.

9. The system of claim 1, further comprising at least one sensor configured to generate data indicative of at least one of an amount of residue within a field that the agricultural implement is moving across or a position of the at least one cleaning wheel, the controller being configured to automatically control actuation of the actuator to adjust the orientation of the line of action of the force applied by the biasing member against the second frame member based on the at least one of the amount of residue within the field or the position of the at least one cleaning wheel.

10. An agricultural implement, comprising:
a frame;
a plurality of row units supported by the frame, the plurality of row units being configured to work a field as the agricultural implement is moved across the field, each row unit comprising:
  a first frame member supported relative to the frame;
  a second frame member pivotably coupled to the first frame member at a first pivot joint;
  at least one cleaning wheel rotatably coupled to the second frame member;
  a biasing member configured to apply a force against the second frame member along a line of action, the biasing member extending between a first biasing end and a second biasing end, the first biasing end being pivotably coupled to the second frame member at a second pivot joint;
  an actuator configured to actuate the biasing member to adjust an orientation of the line of action of the force applied by the biasing member against the second frame member, the actuator extending between a first actuator end and a second actuator end, the second actuator end being pivotably coupled to the second biasing end at a third pivot joint; and
a controller configured to individually control operation of the actuators of the plurality of row units to adjust the orientations of the lines of action of the forces applied by the biasing members of the plurality of row units against the second frame members.

11. The implement of claim 10, each row unit further comprising a lever extending between a first lever end and a second lever end, the first lever end being pivotably coupled to the first frame member, the second lever end being pivotably coupled at the third pivot joint to at least one of the second biasing end of the biasing member or the second actuator end of the actuator.

12. The implement of claim 10, wherein the actuator is configured to selectively actuate the biasing member between a first position and a second position, the line of action of the biasing member spaced further from the first pivot joint when the biasing member is in the first position than in the second position, the biasing member applying a greater moment to the second frame member about the first pivot joint in a first direction when the biasing member is in the first position than in the second position.

13. The implement of claim 10, wherein the actuator is configured to selectively actuate the biasing member between a first position and a second position,
  wherein the biasing member is configured to apply a moment to the second frame member about the first pivot joint in a first direction when the biasing member is in the first position, and
  wherein the biasing member is configured to apply a moment to the second frame member about the first pivot joint in a second direction when the biasing member is in the second position, the second direction being opposite the first direction.

14. The implement of claim 13, wherein the line of action of the biasing member extends above the first pivot joint when the biasing member is in the first position, and the line of action of the biasing member extends below the first pivot joint when the biasing member is in the second position.

15. The implement of claim 10, wherein the actuator of each row unit comprises an electric linear actuator.

16. A method for adjusting a force acting on a row cleaner of a row unit for an agricultural implement, the row unit comprising a first frame member, a second frame member pivotably coupled to the first frame member at a first pivot joint, and at least one cleaning wheel rotatably coupled to the second frame member, the method comprising:
  receiving, by one or more computing devices, an input associated with adjusting a force applied against the second frame member along a line of action; and
  automatically controlling, with the one or more computing devices, an operation of an actuator based at least in part on the input to adjust a position of a biasing member coupled between the actuator and the second frame member,
  wherein the adjustment of the position of the biasing member results in an orientation of the line of action of the force applied by the biasing member against the second frame member being varied.

17. The method of claim 16, wherein the input is received from an operator via a user interface.

18. The method of claim 16, wherein the input comprises data indicative of at least one of residue coverage within a field that the agricultural implement is moving across or a position of the at least one cleaning wheel.

19. The method of claim 18, wherein automatically controlling the operation of the actuator comprises automatically controlling the operation of the actuator to actuate the biasing member such that the force applied by the biasing member against the second frame member in a downward direction is increased when the residue coverage within the field exceeds a maximum residue threshold or when the position of the at least one cleaning wheel is higher than a desired position threshold.

20. The method of claim 18, wherein automatically controlling the operation of the actuator comprises automatically controlling the operation of the actuator to actuate the biasing member such that the force applied by the biasing member against the second frame member in a downward direction is decreased when the residue coverage within the field falls below a minimum residue threshold or when the position of the at least one cleaning wheel is lower than a desired position threshold.

* * * * *